Oct. 17, 1939.   R. D. NEEL   2,176,821
CULTIVATOR
Filed May 19, 1938   4 Sheets-Sheet 3
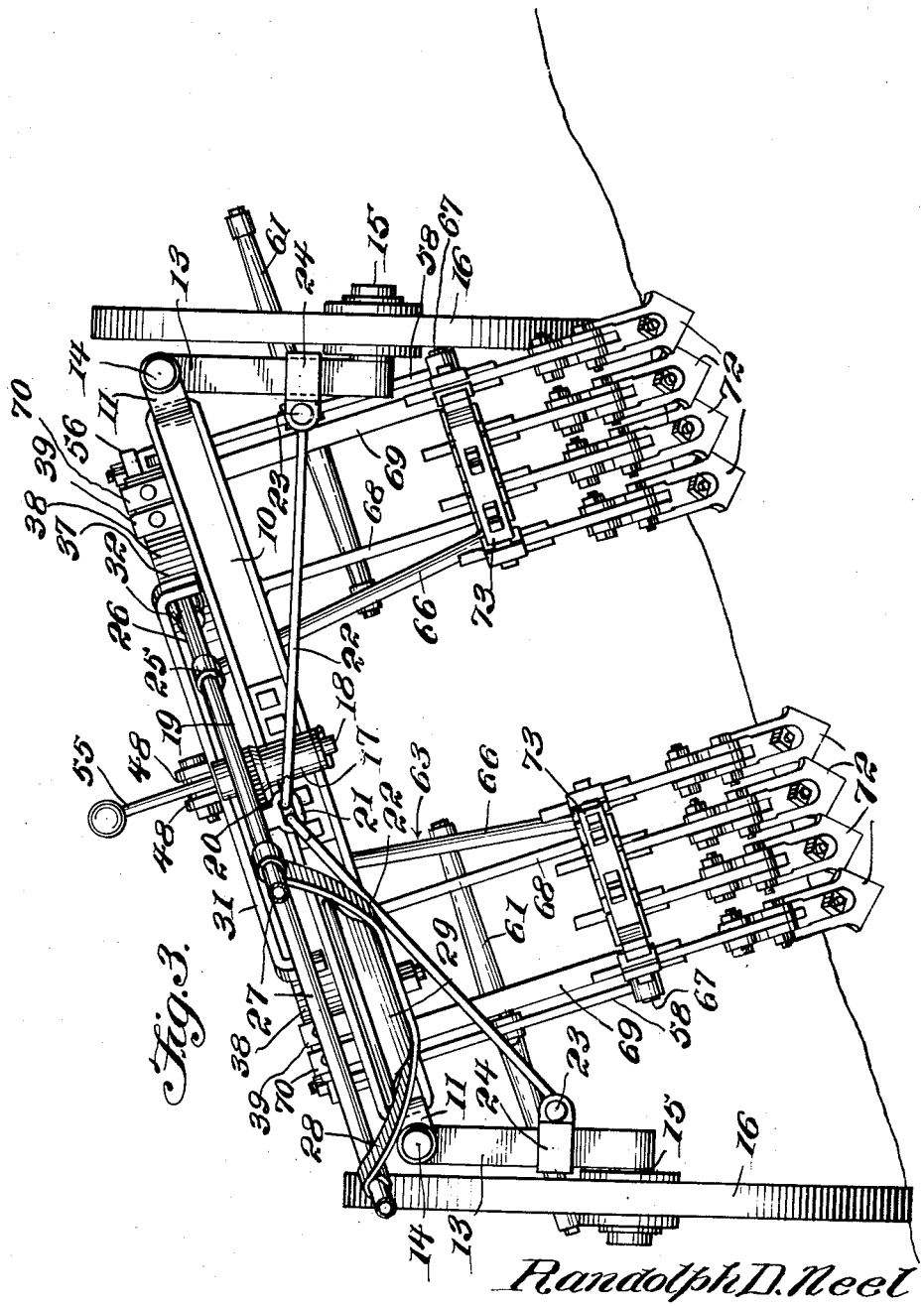
Randolph D. Neel
INVENTOR
BY Victor J. Evans & Co.
ATTORNEYS
WITNESS

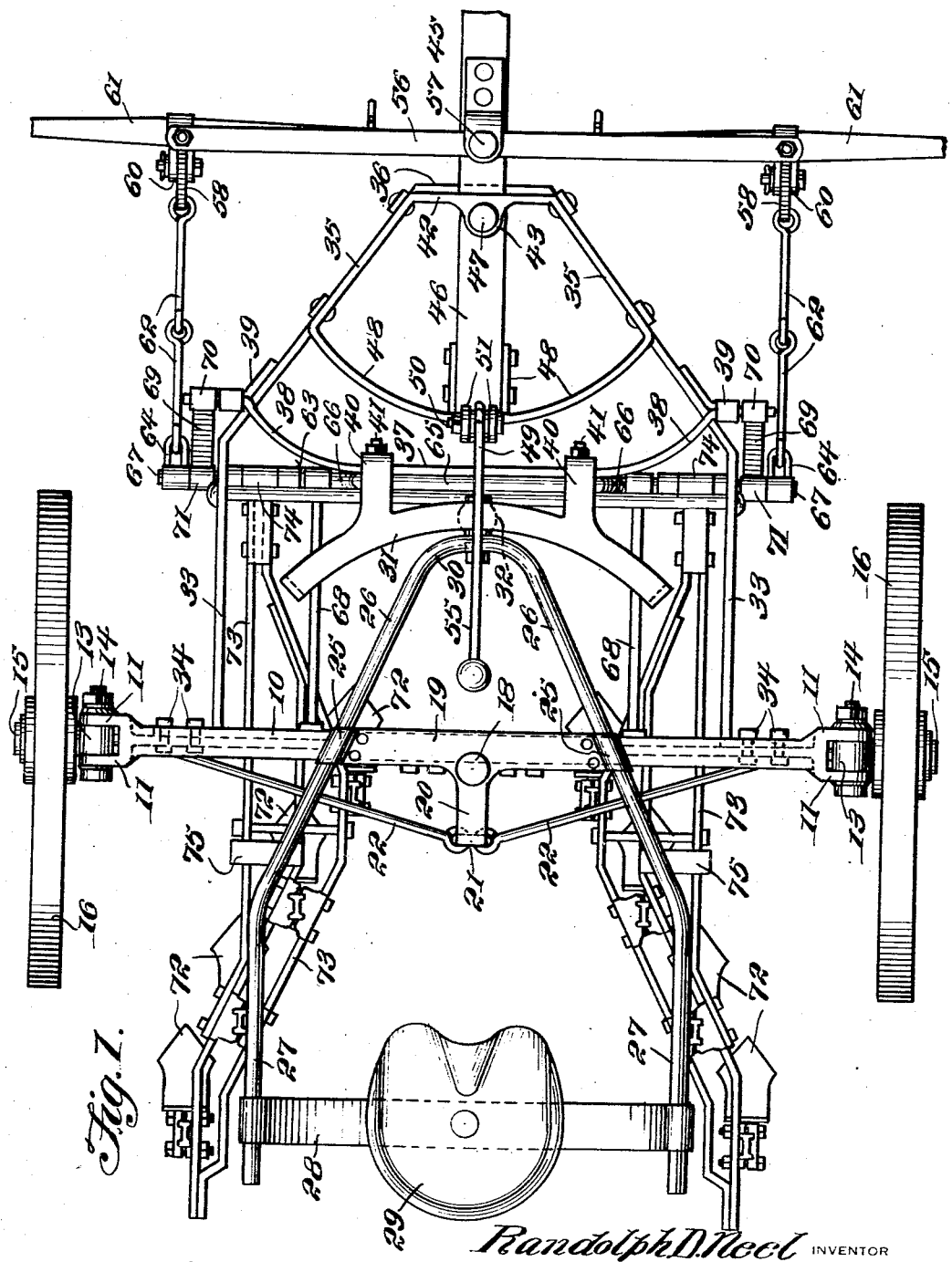

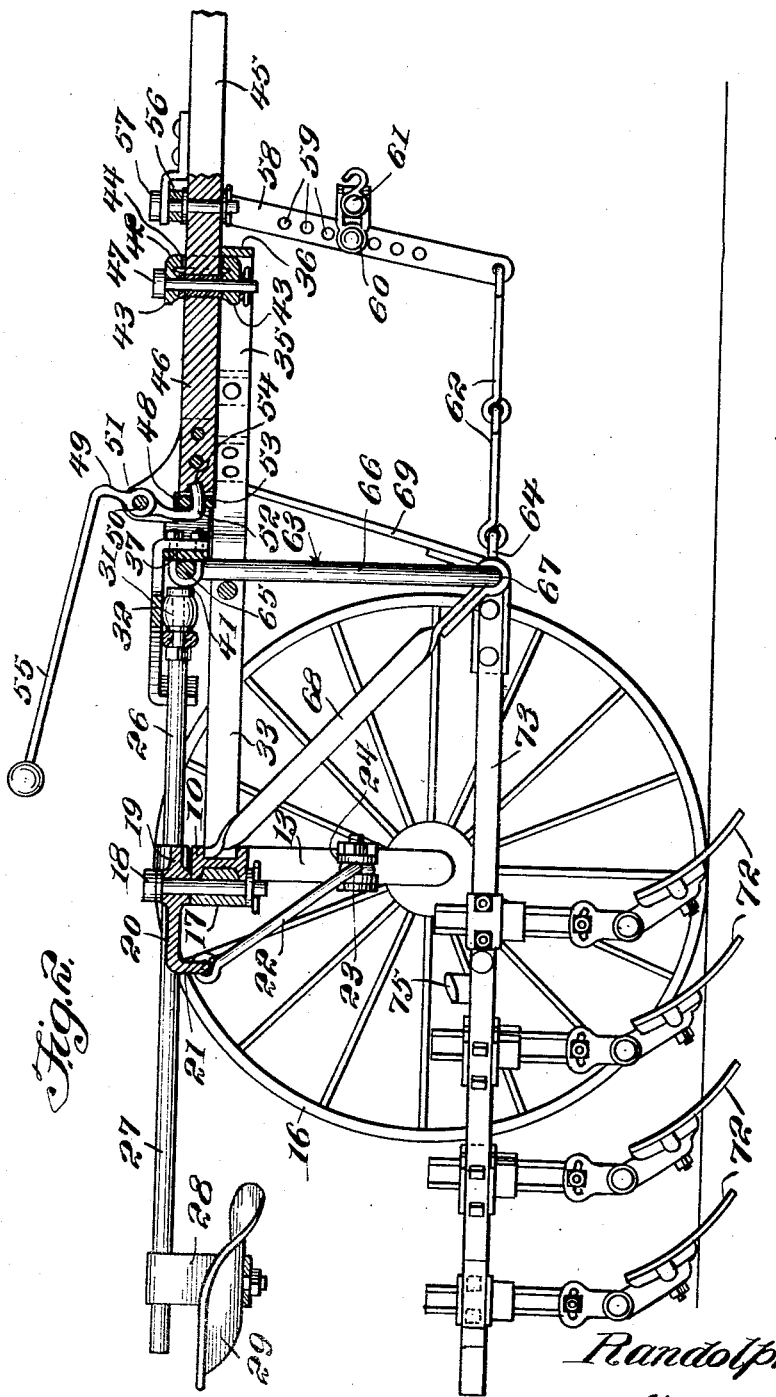

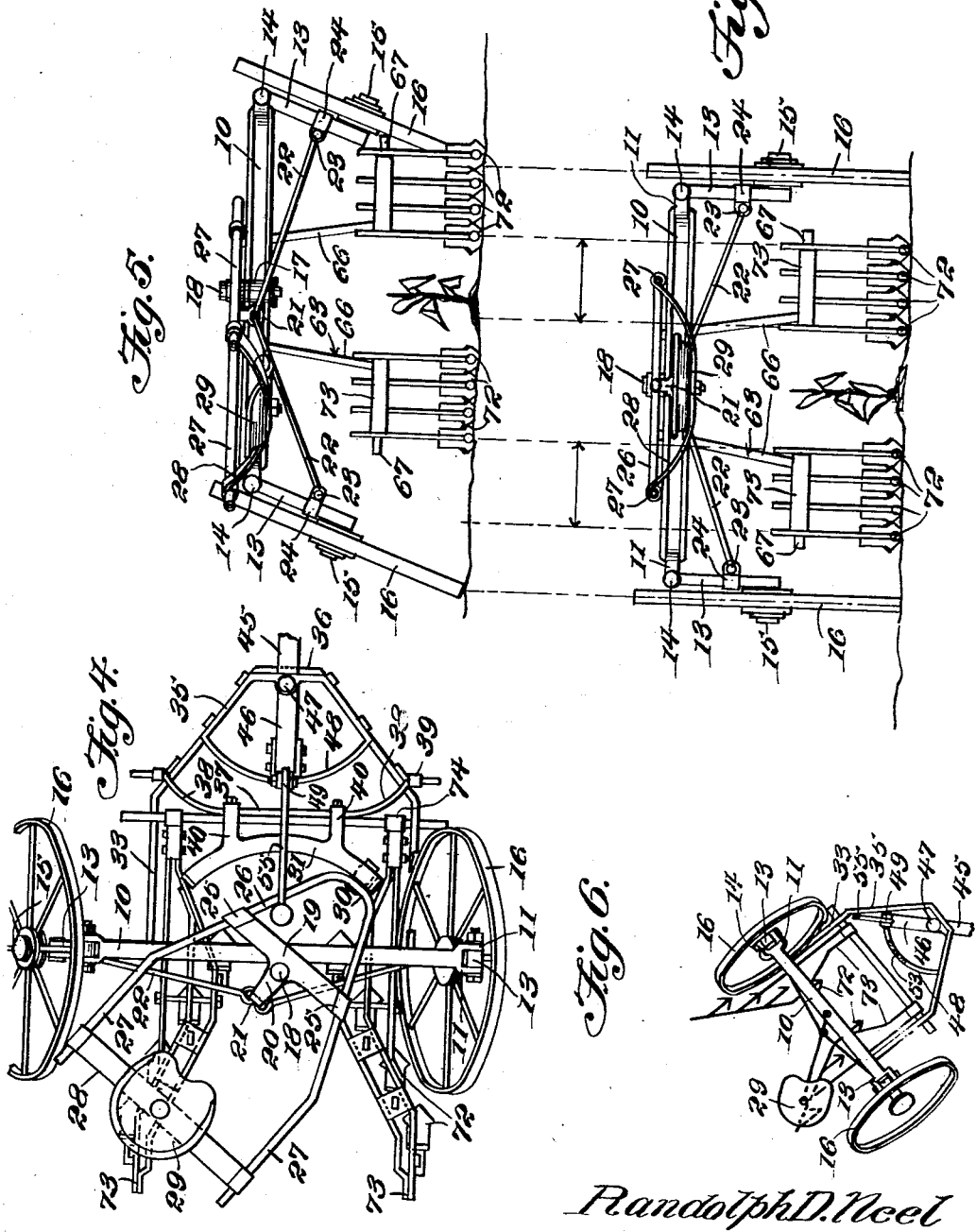

Patented Oct. 17, 1939

2,176,821

UNITED STATES PATENT OFFICE 2,176,821

CULTIVATOR

Randolph D. Neel, Colorado, Tex.

Application May 19, 1938, Serial No. 208,913

5 Claims. (Cl. 97—149)

This invention relates to cultivators and more particularly to such of the compensating vehicle type.

The invention has for its principal object to provide a simple yet practical and efficient shiftable frame type of carriage adjustable under the control of the operator for cultivation of both level and sloping or terraced ground.

With the foregoing and other objects and advantages, as will hereinafter more fully appear, the invention consists in the general structure and in the parts and combinations and arrangements of parts thereof as set forth in the following specification and pointed out with particularity in the appended claims, reference being had to the accompanying drawings illustrating a practical adaptation of the invention, and in which:

Figure 1 is a top plan view with the parts in normal position;

Figure 2 is a longitudinal vertical section;

Figure 3 is a rear elevation showing the cultivator adjusted for operation on sloping ground;

Figure 4 is a plan view, on a smaller scale than the illustration shown in Figure 1, and showing the operator's seat frame operated to shift the wheel frame of the carriage laterally;

Figures 5 and 5ᵃ are comparative rear elevations of the cultivator frame respectively in laterally shifted and neutral positions with the ground wheels traveling in a straight line of draft on level ground in the cultivation of an uneven row of plants, the two views being connected schematically by parallel broken lines to illustrate the relative laterally shifted positions of the pair of ground tool units; and Figure 6 is a plan view illustrative of the action in turning the cultivator and shifting the carriage frame at the end of a row.

Referring now to the drawings, wherein a straddle row cultivator structure embodying the invention is illustrated, the numeral 10 designates an axle beam having bifurcated extensions or spaced lugs 11 at its opposite ends between which the upper end portions of standards 13 are pivotally attached, as at 14, said standards 13 having lateral journal portions 15 on which the ground wheels 16 are mounted.

At the center of the axle beam 10, and on the rear side of said beam, as shown, is a bearing bracket 17 having a vertical opening for the reception of a king-pin or pivot bolt 18 for the attachment of a substantially T-shaped frame member 19 whose stem portion 20 projects rearwardly from the axle beam 10 and is provided at its outer end with an apertured downturned lug 21. Oppositely disposed, inclined stay rods 22 have their inner end portions hingedly secured in the apertured lug 21 at the end of said stem portion 20 of the frame member 19 and their outer ends hingedly attached, as at 23, to cuff members or sleeves 24 which are preferably mounted with provision for endwise adjustment on said standards 13 on which the wheels 16 are journaled as above noted.

At the opposite ends of the crosshead of the T-shaped frame member 19 clip or bracket elements 25 are provided for the attachment of the divergent opposite side members 26 of a seat-carrying and adjusting frame, the extreme end portions 27 of said frame side members extending some distance rearwardly from the inclined portions 26 in parallel relation to each other and being cross-connected by a metal saddle member 28 of sufficient rigidity to afford a transverse brace between said end portions 27 as well as a support for a seat 29.

The looped forward end portion 30 of the seat-carrying frame extends in proximity to an arcuate guide bracket member 31 which is mounted on a draft frame extending forwardly from the axle beam 10, said looped portion 30 of the seat-carrying frame being provided with a forwardly projected roller element 32 which rides on the under side of said arcuate bracket 31 member 31 whereby to afford an antifriction support for the forward portion of said seat-carrying frame when said frame is oscillated on its pivot bolt 18 under the weight of the operator on the seat 29, which movement of the frame is effected by the body movement of the operator as will hereinafter more fully appear.

As shown, the draft frame on which the arcuate bracket member 31 is mounted, comprises parallel side portions 33 which are attached at their inner ends to the outer end portions of the axle beam 10, as at 34, the forward portions of said frame side members 33 converging, as at 35, and being cross-connected at their outer ends, as at 36. In the region where the parallel side portions 33 and convergent portions 35 merge, the draft frame is cross-connected by a transverse brace 37 whose opposite end portions, as shown, are curved forwardly, as at 38, and attached to the convergent frame side portions 35 by brackets 39, the straight transverse middle portions of said cross member 37 affording a support for the arcuate bracket member 31 by means of parallel forward extensions 40 of said bracket member 31, which latter are turned downwardly over the outer face of said member 37 and secured thereto by U-bolts 41.

Secured on the draft frame, adjacent the end cross member 36 thereof, is a bracket 42 provided with opposed upper and lower apertured ears 43 and an opening 44 in its body portion between said ears 43 and above the end cross member 36 of the draft frame. The draft tongue 45 has its inner end portion 46 extended through said opening 44 and between the ears 43, to which latter said draft tongue is pivotally attached, as at 47. The inner end of this draft tongue 45 terminates in proximity to an arcuate cross member 48 which is attached at its opposite ends to the convergent frame portions 35, the curvature of said cross member 48 being on a radius from the axis of the pivotal connection 47 between said tongue and the ears 43 of said bracket element 42. Normally, the inner end portion 46 of the tongue 45 is releasably locked to said arcuate cross member 48 of the draft frame, the locking means, as shown, comprising a latch element 49 which is hingedly mounted, as at 50, between a pair of ears 51 extending upwardly from plates located on opposite sides of the adjacent end portion 46 of said tongue 45 and overhanging said frame cross member 48. This latch element 49 has a hooked end portion 52 which is normally projected through an opening 53 in the cross member 48 in register with a recess 54 in the abutting end portion of the draft tongue under the weight of a handle extension 55 projecting rearwardly in convenient reach of the operator.

In all respects other than the particular mounting of the draft tongue 45 and said releasable locking means therefor, said tongue is provided and equipped for the hitching of a team of horses as in the ordinary cultivator. That is to say, it has the usual doubletree or cross equalizer 56 pivotally attached thereto, as at 57. Depending from the opposite ends of the doubletree 56 are equalizer links 58 which, as shown, are apertured, as at 59, for the adjustable attachment of clevises 60 to which the singletrees 61 are attached, the lower ends of said links 58 being flexibly connected by longitudinal links 62 to the opposite lower portions of a tool supporting frame 63, as at 64.

In the structure herein shown, the tool supporting frame 63 is formed of a single metal bar, the middle portion 65 of which is attached by the same U-bolts to the draft frame cross member 37 which fasten the arcuate bracket member 31 to said frame member 37, the portions of the bar next adjacent the straight intermediate portion 65 being extended divergently downward, as at 66, and thence turned horizontally outward, as at 67, for the attachment of the respective ground tools as will be presently described.

The tool supporting frame 63 is rigidly braced by diagonal stays 68 which are secured at their upper ends to the axle beam 10 and at their lower ends to said outturned horizontal end extensions 67 of the frame, and by stays 69 which are attached at their upper ends, as at 70, to the opposite end extensions of said cross member 37 which project beyond brackets 39 by which said cross member is attached to the draft frame side members 35, the lower ends of said stays 69 being secured, as at 71, to the respective end portions 67 of said tool supporting frame 63.

The several ground tools or cultivator blades 72 are arranged in two like sets at opposite sides of the machine for straddle row operation and each set, as shown, includes four of the elements 72 arranged in diagonal and staggered relation to each other, it being understood, of course, that as far as the present invention is concerned, the form, arrangement and application of the several ground tools may be varied according to the character of the work to be done. As shown, each ground tool unit comprises an elongated open frame 73 which is pivotally attached at its forward end, as at 74, to the horizontal end extension 67 of the frame 63, said frame 73 comprising spaced longitudinal strap members which are converged at their forward end portions to join the means of attachment 74 to the supporting frame portions 67, the rear portions of said frame 73 where the tools 72 are mounted extending divergently so that said tools in their staggered relation to each other travel in different longitudinal lines.

In practice, of course, controlling means for raising and lowering the respective tool units and for holding them in working relation to the ground are provided in the complete machine assembly, but as these parts are obvious and form no part of the present invention they are not illustrated in the drawings.

In the operation of the machine in accordance with the present invention the draft tongue 45 is normally set and locked in line with the longitudinal axis of the machine and the operator's seat supporting and carriage shifting frame is also set in neutral longitudinal position, at which time, of course, the supporting wheels 16 are vertical and the entire carriage structure is substantially level.

In operation of the machine on level ground and in cases where the row of plants being cultivated is irregular or offset at either side in some places throughout the length of the row, the operator riding on the machine may forcibly shift the seat-carrying frame laterally in either direction by movement of his body with his feet supported on rests 75 provided therefor on the outer side members of the tool unit frames 73. By doing this the axles 16 are tilted by reason of the pivotal stay connection 22 between the seat frame bracket extension 20 and the cuff or sleeve members 24 on the wheel standards 13 which are hingedly attached, as hereinbefore described, to the ends of the axle beam 10. This action tilts the wheels 16 to the right or left, as the case may be, the axle beam 10 swinging correspondingly with the wheels 16 and being maintained in its original parallel relation with the ground, and, of course, the pair of ground tool units accordingly move with the axle beam which carries the forward draft framing as well as the tool unit supports. The relative lateral shifting movement of the parts is illustrated in the two comparative views in Figures 5 and 5ᵃ wherein it is apparent that the ground wheels 16 travel straight ahead in the same tracks whether in the tilted position, as shown in the upper illustration, or in the vertical position shown in the illustration therebelow, but the plow elements or ground tools 72 are shifted laterally in straddling relation to the row of plants being cultivated. In this connection, it is also noted that the draft tongue 45 being normally locked in its longitudinal position axially of the machine it, of course, shifts laterally with the axle beam and carried framing and thereby causes the team to give to the right or left, as the case may be. It may be here also noted that the lateral shifting movement of the cultivator body frame may be increased or decreased by changing the position of the cuffs or sleeve members 24 on the wheel standards 13 and correspondingly varying the length of the stay rods 22.

The lateral shifting action of the cultivator is particularly practical and advantageous in plowing and cultivating across sloping ground or terraces, in that the ground wheels 16 may be at all times maintained in vertical position and at the same time the opposed pair of ground tool units are carried in perpendicular relation to the inclined surface of the ground and the tendency of the machine to slip down the incline is thereby obviated.

There is a further material advantage in the provision for releasably locking the draft tongue 45 in its normal working position on the cultivator and in connection with the provision for the lateral shifting action of the cultivator. That is to say, it is possible to plow out or cultivate to the end of the row by inclining the ground wheels 16 upon approaching the end of the row and after unlatching the draft tongue by operating the lever 55 which thereby enables the team to make a short turn while the cultivator frame is being shifted to move the ground tool units still closer to the end of the row. After the turn has been made the cultivator is either left in its lateral shifted position or adjusted back to normal or oppositely inclined position, as may be necessary, and as the team starts ahead on the next row to be cultivated the draft tongue will snap back into its normal locked position.

Obviously, the structure admits of considerable modification within the spirit and scope of the invention as defined by the appended claims. The invention, therefore, is not limited to the specific construction and arrangements shown in the accompanying drawings.

What is claimed is:

1. In a cultivator, a wheeled carriage including a transverse axle beam, swingable ground wheel supporting standards depending from the opposite ends of said axle beam, a seat supporting frame swingably mounted on said axle beam, said frame having a median portion extending longitudinally from one side of the axis of said axle beam, oppositely disposed link connections between said median portion of said seat supporting frame and said axle supporting standards, a forwardly extending body frame on said axle beam, an arcuate bracket member on said body frame in opposed relation to the forward portion of said seat supporting frame, said forward portion of said seat supporting frame having a roller engaging said arcuate bracket member, a depending ground tool support on said body frame, ground tool units on said support, a draft tongue swingably mounted on said body frame, and means for releasably locking said draft tongue in a neutral longitudinal position.

2. In a cultivator, a wheeled carriage including a transverse axle beam, depending wheel standards swingably mounted at their upper end on the end portions of said axle beam, said standards having lateral wheel bearings at their lower ends, a seat supporting frame swingably mounted on said axle beam, said frame comprising a bar rebent at its middle portion and extending forwardly from said axle beam, the portions of said bar next adjacent its middle bend extending divergently across said axle beam and thence rearwardly in parallel relation to each other, a saddle member cross connecting the parallel rear end portions of said frame bar, a seat on said saddle, a substantially T-shaped cross connecting member between divergent portions of said frame bar, said T-shaped member being pivotally attached at the base of its stem portion to the central portion of said axle beam, oppositely disposed link connections between the end of the stem portion of said T-shaped member and said wheel supporting standards at the ends of said axle beam, a forwardly extending body frame on said axle beam, an arcuate bracket member on said body frame, a bearing roller on the forward portion of said axle supporting frame in engagement with said arcuate bracket member of the body frame, ground tool supports on said body frame, a draft tongue swingably mounted on said body frame, an arcuate cross brace on said body frame in cooperative relation to the inner end portion of said draft tongue, and means for releasably locking said tongue to said arcuate cross brace in the neutral longitudinal position of the tongue.

3. A cultivator comprising a carriage having a transverse axle beam provided with substantially vertical ground wheel supports hingedly attached thereto at its opposite ends to swing in a vertical plane, ground wheels journaled on the lower end portions of said hingedly mounted supports to rotate about horizontal axes substantially perpendicular to the supports, ground tool supporting means on said axle beam having a tool-carrying portion depending constantly perpendicularly therefrom, and a seat-carrying frame pivotally mounted on said axle beam to swing therefrom in a substantially horizontal plane and having link connections with said ground wheel supports whereby the swinging of the seat frame forcibly in either direction effects a simultaneous lengthwise movement of the beam and corresponding lateral tilting of the ground wheels on their peripheral bases so that the wheels travel uninterruptedly in a generally straight line of draft but the ground tool supporting means is shifted with the beam laterally from its general straight line of travel.

4. In a cultivator, a wheeled carriage including a transverse axle beam, substantially vertical wheel supporting standards hingedly mounted at their upper ends to the opposite ends of said axle beam, ground wheels journaled on the lower end portions of said standards, a seat supporting frame pivotally mounted on said axle beam to swing therefrom in a substantially horizontal plane, opposed links hingedly connected at one end to said seat supporting frame medially thereof and offset from one side of the beam, said links being hingedly connected at their opposite ends to said wheel supporting standards, whereby movement of the seat frame forcibly in either direction effects lengthwise movement of the axle beam and correspondingly tilts the ground wheels on their peripheral bases, a swingably mounted draft tongue on said carriage, and means for releasably locking said tongue in a neutral longitudinal position.

5. In a cultivator, a wheeled carriage including a transverse axle beam, substantially vertical wheel supporting standards hingedly mounted at their upper ends to the opposite ends of said axle beam, ground wheels journaled on the lower end portions of said standards, a seat supporting frame pivotally mounted on said axle beam to swing therefrom in a substantially horizontal plane, opposed links hingedly connected at one end to said seat supporting frame medially thereof and offset from one side of the beam, said links being hingedly connected at their opposite ends to said wheel supporting standards, whereby movement of the seat frame forcibly in either direction effects lengthwise movement of the axle beam and correspondingly tilts the ground wheels on their peripheral bases, a forwardly extending body frame mounted rigidly on said axle beam, a ground tool support on said body frame, a draft tongue mounted to swing in a horizontal plane on said body frame, and means for releasably locking said tongue in a neutral longitudinal position.

RANDOLPH D. NEEL.